United States Patent [19]

le Granse

[11] Patent Number: 4,550,024
[45] Date of Patent: Oct. 29, 1985

[54] APPARATUS FOR PREPARING HOT DRINKS

[75] Inventor: Josephus N. le Granse, Nieuwegein, Netherlands

[73] Assignee: Dowe Egberts Koninklijke Tabaksfabriek-Koffiebranderijen-Theehandel N.V., Utrecht, Netherlands

[21] Appl. No.: 572,373

[22] Filed: Jan. 20, 1984

[30] Foreign Application Priority Data

Jan. 20, 1983 [NL] Netherlands ......................... 8300213

[51] Int. Cl.⁴ ..................... A47G 19/16; A47J 31/00; B65D 85/00
[52] U.S. Cl. ........................................ 426/77; 426/84; 426/112; 426/115; 426/433; 99/295; 99/304; 99/306
[58] Field of Search ......................... 99/295, 304, 306; 426/77, 82, 79, 84, 433, 112, 115; 277/135; 220/228

[56] References Cited

U.S. PATENT DOCUMENTS

| | | | |
|---|---|---|---|
| 1,876,474 | 9/1932 | Starkey | 99/295 |
| 2,936,695 | 5/1960 | Donot | 99/295 |
| 3,083,101 | 3/1963 | Noury | 99/295 |
| 3,373,677 | 3/1968 | Petrozzo | 426/77 |
| 3,389,650 | 6/1968 | Michielsen | 426/433 |
| 3,411,431 | 11/1968 | Moerlini et al. | 99/304 |
| 3,610,132 | 10/1971 | Martin et al. | 99/295 |
| 3,822,013 | 7/1974 | Vander Veken | 99/295 |
| 3,823,656 | 7/1974 | Vander Veken | 99/295 |

FOREIGN PATENT DOCUMENTS

| | | | |
|---|---|---|---|
| 620881 | 11/1962 | Belgium | 426/433 |
| 1080222 | 12/1954 | France | |
| 1347892 | 11/1962 | France | 99/306 |
| 598677 | 10/1959 | Italy | |
| 364328 | 10/1962 | Switzerland | 99/295 |

Primary Examiner—Steven Weinstein
Attorney, Agent, or Firm—Cushman, Darby & Cushman

[57] ABSTRACT

Apparatus for brewing, in particular, a multiplicity of consumption units of a hot drink, such as coffee. The apparatus comprises a combination of a filter pan and a disposable filter cartridge with cellulose web filters. According to the invention, the filter cartridge and the filter pan have parts cooperating to provide a circumferential seal, dimensioned so that when introduced the filter cartridge rests loosely in the filter pan without being clamped therein, and a seal is provided by means of capillary forces that occur during brewing in the gap between the cooperating parts. The filter cartridge may have an axially symmetrical body, and the parts of the filter pan and the filter cartridge co-operating to provide a seal may have a substantially equal axially symmetrical conicity.

5 Claims, 2 Drawing Figures

APPARATUS FOR PREPARING HOT DRINKS

In cafés and restaurants, canteens and offices, beverage dispensing machines are known which are capable of serving, among other drinks, a large number of consumption units of coffee in succession. These machines are relatively expensive and require relatively intensive maintenance. When a limited number of people have to be served, a simpler solution is generally preferred. In that case use is made of one or more simple apparatus capable of producing, per apparatus, and per time, for example one to two liters of coffee brew. Such an apparatus has a portion supplying the desired amount of hot water and a portion housing the ground coffee that must be extracted with the hot water supplied by the first portion. This latter portion consists, in a conventional form, of a container (reservoir) in which a web-shaped disposable filter medium, such as filtering paper, is put on a supporting perforated intermediate bottom. On this filter medium, the amount of ground coffee required for the brew is dosed in each case. All this implies a number of operations which are experienced as time-consuming, namely introducing or/and cleaning the intermediate bottom, introducing the filter medium so that it makes proper contact with the wall (to prevent water from bypassing the coffee and to prevent the escape of coffee particles), and metering the desired amount of coffee. After use, the container must be carefully cleaned to remove appendant particles of coffee grounds and coffee fat.

To avoid the above disadvantages, industrially made so-called filter cartridges have been proposed, which contain exactly the required amount of ground coffee. These are thrown away after use. The filter cartridge consists of ground coffee confined in a (possibly more than one) filter chamber. A filter chamber consists of two sheetshaped filters spaced some distance from each other by means of a body of synthetic plastics material. The disposable filter cartridge must be capable of being introduced in a reservoir for receiving the hot water needed for the brew in a simple manner. This reservoir is commonly called "filter pan".

Proposals for disposable filter cartridges are to be found, for example, in French patent No. 1,080,222 to Bojarski (1954) and Swiss patent No. 364,328 to Noury (1962). It is clear that care must be taken that when the filter cartridge is introduced into the filter pan such a seal is produced that the hot water poured on does not leak away between the filter cartridge and the inner wall of the filter pan. If this happens, coffee brews of non-uniform strength are produced.

The point of departure in the above patent specifications is the principle that the filter cartridge must consist of a boxshaped filter chamber with a water-permeable top and bottom, and filled between the top and bottom with ground coffee as to 100%. Evidently the designers were afraid that, when the filter chamber is partially filled, owing to an irregular distribution of the ground coffee in the filter chamber, the water fails to percolate uniformly through the ground coffee during brewing, so that brews of non-uniform strength and quality would be obtained. Owing to the absorption of water during brewing, however, the coffee particles swell. As a consequence it was not possible for the top and bottom of the filter chamber to be made of web-shaped cellulose ("paper") only. These would become torn upon the expansion of the coffee. It was therefore proposed that the top and bottom should be made of thin sheets of perforated synthetic plastics material or metal. This, however, cannot of course prevent the filter cartridge from becoming distorted during brewing, one result of which is that proper sealing between the filter cartridge and the filter pan becomes illusory. Indeed, the proposed filter cartridges have never been adopted in practice.

Later on it has been appreciated that complete packing of the filter chamber was unnecessary. In fact, when water is taken up the coffee particles will begin to "float" (at any rate when the water supply and throughput are so attuned to each other that a water layer is formed in the filter chamber). Owing to this "floating" (which implies floatingly "settling") the coffee will be distributed in the filter chamber practically uniformly. This ensures brews of uniform strength and quality, naturally under otherwise equal conditions (such as temperature and rate of water supply), at least if the seal between filter pan and filter cartridge were to function properly. In Belgian patent No. 646,824 (Miko) such a filter cartridge is described for a so-called "one-cup filter". According to that patent, the cartridge must become jammed by means of a rim in a reservoir functioning as a filter pan. Even with this one-cup filter, this method of sealing results in difficulties. The filter cartridge in question has a diameter of ca. 5 cm. In the case of so-called "multi-cup filters", which normally have to produce 1-2 liters of brew, these difficulties are considerably greater. Filter cartridges for such quantities of brew have a diameter of ca. 15 cm. Causing a filter cartridge perimeter of 40-45 cm to be in water-sealing contact forms an evident problem, especially as the filter cartridge body, normally of synthetic plastics material, begins to expand owing to the high temperature (which in practice never takes place fully uniformly). Indeed, in Belgian patent No. 661,534 to Miko (1965) it is proposed that the filter cartridge should be given such a shape that it can be "jammed by key action" in a conical portion of the filter pan. The example described in the patent has never become commercially available. What has been marketed for some years, however, is an embodiment in which a filter cartridge has a conical part which when compressed becomes wedged in a conical part of the filter pan cooperating with it. All this is manifested in that, after the introduction of the filter cartridge the latter does not become dislodged when the filter pan is "held upside down", not even when shaken vigorously. Owing to the clamping action, however, stresses occur, which are raised still further at the high temperatures during brewing. Moreover, the synthetic plastics material used for the filter cartridge body must be rather "flexible" for the filter cartridge to be clamped in the—generally metal—filter pan in proper contact throughout.

Experiments have shown that, owing to the effect referred to, a really good contact is not obtained in practice, and leakage occurs after all. Indeed, a constant uniform quality and strength of the brew is not obtained. According to the present invention the—seemingly so obvious—clamping upon the introduction of the filter cartridge must exactly be prevented. That is to say, a capillary space must be left between a part of some length of the filter cartridge and a cooperating part of the inner wall of the filter pan. This must be such that sealing is obtained purely by capillary forces.

According to the present invention, there is accordingly provided an apparatus for brewing in particular a multiplicity of consumption units of a hot drink, such as coffee, comprising a combination of a filter pan and a disposable filter cartridge with cellulose web filters, said filter cartridge fitting said filter pan, the filter pan and the filter cartridge having cooperating parts providing for a water seal when the filter cartridge is brought into the filter pan and the water poured on, characterized by such a dimensioning of the parts cooperating to provide the seal that when introduced the filter cartridge rests loosely in the filter pan without being clamped therein, and a seal is provided by means of capillary forces that occur during brewing in the gap between said cooperating parts. The non-clamping character of the apparatus according to the invention can be demonstrated by turning the filter pan upside down after a filter cartridge has been introduced therein. The cartridge then falls out of it immediately, even if after the introduction the rim of the filter cartridge is firmly pressed down by hand.

In a preferred embodiment of the invention, the body of the filter cartridge has an axially symmetrical form, and the parts of the filter cartridge and the filter pan that cooperate to provide a seal exhibit a substantially equal axially symmetrical conicity of between 0° and 45°, the length of these portions ranging between ½ and 3 cm. The angles as given are measured as deviations from the direction of the axis of the filter body. Particularly suitable are angles of between 1° and 10° and lengths of 1–2 cm.

In a highly suitable embodiment, the filter cartridge has a substantially radially directed circumferential edge, preferably off-set outwardly, which when the filter cartridge is introduced into the filter pan rests loosely on a substantially radially directed, inwardly projecting circumferential edge of the filter pan. In the operative condition therefore, the filter cartridge rests on a substantially horizontal edge.

It has further been found that the capillary gap remaining between the parts of the filter pan and the filter cartridge that cooperate to provide a seal should preferably be between ¼ and ¾ mm. The body of the filter cartridge must have such a general shape, and the thickness of its material must be such, suiting the nature of the material, that at the temperatures employed, this body has a sufficient dimensional stability. Injection-molded polystyrene having a thickness of 0.5–1.0 mm, for example, is a very suitable synthetic plastics material. In normal cases the filter pan will be of metal.

BRIEF DESCRIPTION OF THE DRAWINGS

One embodiment of the invention will now be described, by way of example, with reference to the accompanying drawings, in which.

Figure 1:
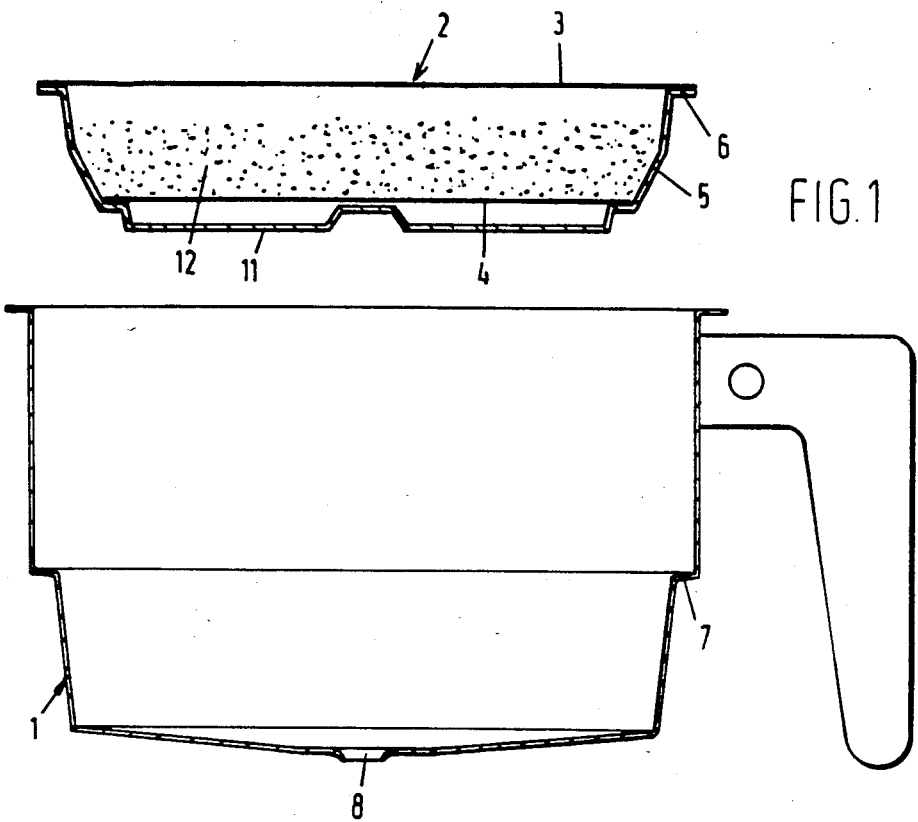
FIG. 1 represents a cross-sectional view of a preferred embodiment of the invention.
Figure 2:
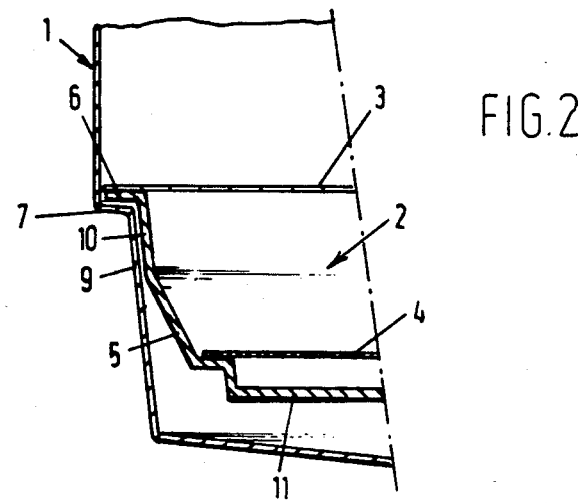
FIG. 2 shows a detail of the sealing mechanism.

Referring to the drawings, there is shown a metal filter pan 1 with an outlet 8, a filter cartridge 2 with a polystyrene filter body 5 of 0.6 mm. This filter body 5 is provided with an outward circumferential collar 6, which when the filter cartridge is introduced rests loosely on the inwardly projecting circumferential edge 7 of the filter pan. The filter cartridge has a web-shaped top filter 3 and a web-shaped bottom filter 4. The bottom filter 4 is supported by a bottom 11 of the filter body with sufficient cut-outs to allow the water to pass unimpeded. The parts of the filter cartridge and the filter pan which cooperate to provide a seal are respectively designated by 10 and 9. They have a conicity of 2°. The capillary gap remaining after the introduction of the filter cartridge in the filter pan is ca. 0.5 mm wide. The ground coffee is designated by 12. For a brew of 1–2 liters, the amount of coffee will range between ca. 40 g. and 100 g.

In the above, the apparatus according to the invention has been described with reference to coffee. Naturally, the invention is not so limited. Brews or infusions of tea, herbs or chicory, for example, can also be prepared with the apparatus according to the invention.

What I claim is:

1. Apparatus for multi-cup brewing of ground coffee comprising:
   a reusable filter pan having an inwardly directed shoulder and a part in the shape of a reverse truncated cone extending donwardly from said shoulder and
   a disposable filter cartridge containing ground coffee having an upper outwardly directed flange which rests loosely on said shoulder thus supporting said filter cartridge without clamping said cartridge in said pan and a part in the shape of a reverse truncated cone extending downwardly from said shoulder with an outside surface cooperating with and having substantially equal concavity as said filter pan part and slightly less radial diameter than said filter pan part the space between said parts is such that, when hot brewing water is poured into said pan and enters the space, a capillary seal is formed which prevents additional hot brewing water from thereafter bypassing said cartridge.

2. Apparatus according to claim 1 wherein the capillary gap remaining between the parts of the filter pan and the filter cartridge is ¼–¾ mm.

3. Apparatus according to claim 1, wherein said filter cartridge has an axially symmetrical body, and the parts of the filter pan and the filter cartridge exhibit a substantially equal axially symmetrical conicity of between 0° and 45°, the length of these parts ranging between ½ and 3 cm.

4. Apparatus according to claim 3, wherein the conicity ranges between 1° and 10°, and the parts have a length of 1–2 cm.

5. Apparatus according to claim 3, wherein the filter pan is of metal, and the body of the filter cartridge has such a design and is made of such synthetic plastics material that the radial diameter of the cartridge part is formed with a tolerance not exceeding 0.2 mm.

* * * * *

UNITED STATES PATENT AND TRADEMARK OFFICE
CERTIFICATE OF CORRECTION

PATENT NO.   :   4,550,024

DATED        :   October 29, 1985

INVENTOR(S)  :   LE GRANSE, Josephus N.

It is certified that error appears in the above-identified patent and that said Letters Patent is hereby corrected as shown below:

The Assignee should be corrected to read:

"DOUWE EGBERTS KONINKLIJKE TABAKSFABRIEK-KOFFIEBRANDERIJEN-THEEHANDEL N.V."

Signed and Sealed this

Third Day of June 1986

[SEAL]

Attest:

DONALD J. QUIGG

Attesting Officer

Commissioner of Patents and Trademarks